Patented Sept. 11, 1934

1,973,087

UNITED STATES PATENT OFFICE

1,973,087

METAL TREATING COMPOUND AND METHOD OF USING THE SAME

John W. Markley and Thomas W. Clement, Washington, Pa., assignors to Peerless, Incorporated, a corporation of Pennsylvania No Drawing. Application April 30, 1932, Serial No. 608,555

2 Claims. (Cl. 148—8)

Our invention relates to improvements in a metal treating compound and its method of use for the purpose of effecting removal of foreign matter, scale, etc. and of simultaneously pickling the metal preparatory to immersion in a metal coating bath, or otherwise, for use of the metal in the various ways customary in the metallurgical arts.

In the present practice of pickling metal bars, plates, sheets, wire, or the like, a pickling bath containing acid in solution is ordinarily used, sometimes with various associated materials, in the general class of inhibitors, and well known in the art. Ordinarily such an acid pickling bath is so active on the metal itself, and on the metal walls of the tank, if used, that other acid-immune lining material, such as lead or wood, must be used to prevent tank destruction. The acid content also generates dangerous and objectionable fumes and vapors, while tending to cause over-pickling during prolonged subjection of the metal articles to the bath, producing pitting and other surface imperfections.

In the prior patent of joint applicant Markley, No. 1,747,638, is disclosed a boiler compound for removing scale and other surface incrustations by the action of a composition or bath composed of crude petroleum, potatoes, oak bark, walnut bark, boneset, wild cherry bark and potash.

The oil, potatoes, oak bark, and potash tend to loosen the scale or other incrustation, but are not otherwise effective. The wild cherry bark, boneset, and walnut bark tend to dissolve the loosened incrustation, retaining it in suspension in the water.

The thus dissolved fine material with the oil and other elements of light specific gravity, also tend to form a floating scum over the surface of the bath, which is particularly useful in connection with the present invention.

We have discovered that by adding to the boiler compound containing the above named ingredients a small proportion of sulphuric acid, say from 3% to 5% of the whole mass, we produce a solution which is sufficiently active to selectively control the bath with sufficiently effective pickling. It not only removes all foreign matter from the metal being treated, but at the same time effects a greatly improved and entirely safe pickling operation.

The pickling action of the acid is completely effective, especially with stainless steel, alloys, or the like, and without risk of over-pickling. Its action is restrained by the counteracting effect of the several elements of the scale removing compound, in combination with the acid, and the composition as a whole has proven highly effective in practice.

In making a usable batch of say two hundred gallons, we preferably use about one quart of crude petroleum, ten pounds of potatoes, ten pounds of oak bark, ten pounds of walnut bark, five pounds of boneset, ten pounds of wild cherry bark, ten pounds of potash, preferably hydroxide, and sufficient water to complete the quantity.

These ingredients are subjected to boiling for thorough mixing, dissolving, and disintegration for about ten hours, after which is added say 3% to 5% of commercial sulphuric acid, the whole mixture then being used in the usual way in a vat, for cleaning and simultaneous pickling.

The proportions as given may be variously modified within limited ranges dependent on the kind of metal to be treated, its condition as to incrustation or amount of foreign matter to be removed, the use for which the metal is intended, or other conditions attending the operation.

What we claim is:

1. The method of treating metal for removal of foreign matter and pickling the surface consisting in subjecting the metal to a bath composed of substantially two hundred gallons of water, one quart of crude petroleum, ten pounds of potatoes, ten pounds of oak bark, ten pounds of walnut bark, five pounds of boneset, ten pounds of wild cherry bark, ten pounds of potash hydroxide, first boiled and filtered, with an added content of three percent of sulphuric acid, or multiples of said ingredients, substantially as described and insufficient to effect over-pickling.

2. A metal treating compound consisting of the following materials in substantially the following proportions avoirdupois, to wit, crude petroleum one quart, potatoes ten pounds, oak bark ten pounds, walnut bark ten pounds, boneset five pounds, wild cherry bark ten pounds, potash hydroxide ten pounds, water sufficient to make two hundred gallons, boiled and filtered, and approximately three percent of sulphuric acid added thereto.

JOHN W. MARKLEY.
THOMAS W. CLEMENT.